(12) United States Patent
Sloan et al.

(10) Patent No.: US 9,688,138 B2
(45) Date of Patent: Jun. 27, 2017

(54) STRAP GUIDE AND TANK MOUNTING FIXTURE

(71) Applicants: Agility Fuel Systems, Inc., Fontana, CA (US); Quantum Fuel Systems Technologies Worldwide, Inc., Lake Forest, CA (US)

(72) Inventors: Todd Sloan, Kelowna, CA (US); Chris Forsberg, Kelowna, CA (US); Mark Warner, Lake Forest, CA (US); Hernan Henriquez, Lake Forest, CA (US)

(73) Assignees: Agility Fuel Systems, Inc., Costa Mesa, CA (US); Douglas Acquisitions LLC, Larkspur, CA (US)

( * ) Notice: Subject to any disclaimer, the term of this patent is extended or adjusted under 35 U.S.C. 154(b) by 0 days.

(21) Appl. No.: 14/935,338

(22) Filed: Nov. 6, 2015

(65) Prior Publication Data

US 2016/0185214 A1   Jun. 30, 2016

Related U.S. Application Data (63) Continuation of application No. 13/829,297, filed on Mar. 14, 2013, now Pat. No. 9,193,261.

(Continued)

(51) Int. Cl.
*B60K 15/07* (2006.01)
*B60K 15/067* (2006.01)
(Continued)

(52) U.S. Cl.
CPC ............ *B60K 15/07* (2013.01); *B60K 15/067* (2013.01); *F17C 1/04* (2013.01); *F17C 1/06* (2013.01);
(Continued)

(58) Field of Classification Search
CPC .... B60K 15/07; B60K 15/067; B60K 15/063; B60K 15/03; B60K 15/073; B65D 63/10;
(Continued)

(56) References Cited

U.S. PATENT DOCUMENTS 2,335,038 A * 11/1943 Bridges .................. B21F 17/00
                                                      140/2
2,370,677 A *  3/1945 Mapes ...................... F17C 1/06
                                                     220/590

(Continued)

FOREIGN PATENT DOCUMENTS

| EP | 1908619 A1 | 4/2008 |
|---|---|---|
| JP | 2006123590 A | 5/2006 |
| WO | WO-0024608 A1 | 5/2000 |

OTHER PUBLICATIONS

European search report and search opinion dated Oct. 14, 2015 for EP Application No. 13763970.4.

(Continued)

*Primary Examiner* — Robert J Hicks
(74) *Attorney, Agent, or Firm* — Wilson Sonsini Goodrich & Rosati (57) ABSTRACT

A system for enabling securing devices configured to hold fuels, such as gas cylinders, to frames is provided. The system includes an isolator fastened to the device configured to hold fuel and a strap that is attached to the frame. The isolator includes barriers on either side that prevent longitudinal slipping of the strap and ridges disposed between the barriers, which create cushioning between the strap and the device configured to hold fuel.

20 Claims, 6 Drawing Sheets

Related U.S. Application Data (60) Provisional application No. 61/613,928, filed on Mar. 21, 2012.

(51) Int. Cl.
  *F17C 1/06* (2006.01)
  *F17C 1/04* (2006.01)
  *F17C 1/02* (2006.01)
  *B60K 15/063* (2006.01)

(52) U.S. Cl.
  CPC ... *B60K 2015/0636* (2013.01); *B60Y 2200/14* (2013.01); *B60Y 2200/142* (2013.01); *B60Y 2200/24* (2013.01); *Y10T 29/49826* (2015.01)

(58) Field of Classification Search
  CPC ... B65D 63/00; F17C 1/06; F17C 1/04; F17C 1/02; F17C 13/081; F17C 13/083; F17C 13/084
  USPC ......... 220/562, 589, 588, 586, 592; 29/428; 180/314; 224/402, 557, 556, 555, 545, 224/572, 563, 400; 280/834
  See application file for complete search history.

(56) References Cited

U.S. PATENT DOCUMENTS

| | | | |
|---|---|---|---|
| 2,376,351 A | 5/1945 | Gay | |
| 2,381,396 A | 8/1945 | Kuhn | |
| 2,744,043 A * | 5/1956 | Ramberg | B29C 53/602 156/155 |
| 3,661,294 A | 5/1972 | Lee et al. | |
| 3,668,740 A * | 6/1972 | Pearson | B29C 70/347 24/16 PB |
| 3,697,093 A | 10/1972 | Sean | |
| 4,480,845 A | 11/1984 | Hansen | |
| 5,257,761 A | 11/1993 | Ratz et al. | |
| 5,758,796 A * | 6/1998 | Nishimura | F17C 1/06 220/590 |
| 6,202,674 B1 | 3/2001 | Wingett | |
| 6,380,523 B1 | 4/2002 | Jones, Sr. | |
| 6,402,198 B2 | 6/2002 | Gollungberg | |
| 6,843,237 B2 | 1/2005 | Bowen et al. | |
| 6,896,318 B2 | 5/2005 | Marrs et al. | |
| 7,189,040 B2 | 3/2007 | Sharp et al. | |
| 7,819,431 B2 | 10/2010 | Minami | |
| 7,984,925 B2 | 7/2011 | Levin et al. | |
| 2004/0160052 A1 | 8/2004 | Marsala et al. | |
| 2005/0035629 A1 | 2/2005 | Marrs et al. | |
| 2006/0061081 A1 | 3/2006 | Kresse et al. | |
| 2008/0284152 A1 | 11/2008 | Levin et al. | |
| 2009/0114784 A1 | 5/2009 | Tam | |
| 2009/0189384 A1 | 7/2009 | Schoen et al. | |
| 2013/0284748 A1 | 10/2013 | Sloan et al. | |
| 2013/0292387 A1 | 11/2013 | Spencer et al. | |

OTHER PUBLICATIONS

International search report and written opinion dated Jul. 10, 2013 for PCT/US2013/033368.
Notice of allowance dated Aug. 6, 2015 for U.S. Appl. No. 13/829,297.
Office action dated Mar. 24, 2015 for U.S. Appl. No. 13/829,297.

* cited by examiner

STRAP GUIDE AND TANK MOUNTING FIXTURE

CROSS-REFERENCE

This application is a continuation application of U.S. patent application Ser. No. 13/829,297, filed on Mar. 14, 2013, which claims the benefit of U.S. Provisional Patent Application Ser. No. 61/613,928, filed Mar. 21, 2012, which applications are entirely incorporated herein by reference.

BACKGROUND OF THE INVENTION

Devices configured to hold fuel such as gas cylinders or tanks, including cylinders holding compressed natural gas mounted on natural-gas-powered vehicles, need to be secured to the vehicle frame. The devices configured to hold fuel are sometimes held in place by straps with the aid of isolators. An isolator can be disposed around a portion of the device configured to hold fuel.

Challenges remain, however, for securing devices configured to hold fuel, such as gas cylinders which may be side-mounted, or roof-mounted to vehicles including trucks. For example, longitudinal sliding or circumferential spinning of the devices configured to hold fuel, such as gas cylinders, must be minimized to prevent breakage and reduce explosion hazards. The challenges are particularly significant for large gas cylinders, and other devices configured to hold fuel such as tanks carrying a fuel used to power vehicles.

Thus, a need exists for improved systems and methods of mounting fuel containers to vehicles.

SUMMARY OF THE DISCLOSURE

Some aspects of exemplary implementations of the disclosure provide isolators that may be fastened to devices configured to hold fuel, such as cylinders or tanks (which may be referred to as tank body or tank bodies) by one or more of various systems, devices, or methods. The isolators can be wound into the cylinders by strands, strings or ties that are part of the extruded isolator shape, attached to the cylinder via an adhesive, secured by means of increased friction resulting from ridges or ribs on the isolator surface, secured by means of flaps on the isolator, or secured to the cylinder by some other means in addition to the natural tension of the isolator material. In some cases, isolators secured to the cylinders in this manner may help prevent the cylinders from spinning once the cylinders are further secured to the truck frame with straps.

Some aspects of exemplary implementations of the disclosure provide isolators configured to interact with straps that help secure the device configured to hold fuel. The device can be secured to a frame, and the frame can be a part of a vehicle, such as a truck. The isolators may have exposed ribs or ridges on the surface on which the isolator comes into contact with the strap, providing improved cushioning or additional isolation between the cylinder and the strap due to increased distance between the cylinder and the strap and the padding effect of the ribs or ridges. This cushioning and padding reduces the strain and friction from the contact between the strap and the isolator, reducing strap fatigue and wear that may occur as a result of the friction. In some cases, the cushioning also provides additional space between the device configured to hold fuel and the strap that helps hold the device in place. This added spacing accommodates expansion of the fuel tank, such as a natural gas tank, caused by the changes in pressure of the gas or vaporization of a liquid fuel. Without the added spacing between the strap and the cylinder as provided by an isolator having ribs or ridges, the strap might break due to the expansion of the tank due to an increase in gas pressure.

Exemplary implementations of the disclosure include the presence of a pair of barriers or ears on both sides of the isolator. The ears longitudinally secure straps used to hold tanks onto a frame so that the straps cannot slide off the rubber isolator. If a strap were to slide off the isolator, it would no longer tightly hold the device configured to hold fuel, such as a gas cylinder, in place, resulting in likely slippage and possible breakage of the device.

Additional aspects and advantages of the disclosure will become readily apparent to those skilled in this art from the following detailed description, wherein only illustrative embodiments of the present disclosure are shown and described. As will be realized, the present disclosure is capable of other and different exemplary implementations, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

Some of the features of the disclosure are set forth with particularity in the appended claims. A better understanding of the features and advantages herein will be obtained by reference to the following detailed description that sets forth illustrative embodiments, in which the principles of the disclosure are utilized, and the accompanying drawings of which:

DETAILED DESCRIPTION OF THE INVENTION

While various exemplars have been shown and described herein, it will be obvious to those skilled in the art that such embodiments are provided by way of example only. Numerous variations, changes, and substitutions may occur to those skilled in the art without departing from the invention described herein. It should be understood that various alternatives to the exemplars described herein may be employed in practicing the disclosure.

The disclosure provides systems and devices for securing fuel-holding devices to frames, where the frames are sometimes attached to vehicles, in accordance with aspects of the disclosure. Various aspects of the invention described herein may be applied to any of the particular applications set forth below or for any other types of securing systems. The disclosure may be applied as a standalone system or method, or as part of a vehicle or other system that utilizes fuel. It shall be understood that different aspects of the disclosure can be appreciated individually, collectively, or in combination with each other.

Isolators Secured to Fuel Tanks/Cylinders

Some aspects of the disclosure provide isolators that are fastened to fuel cylinders, tanks, vessels, or any other type of device capable of containing a gaseous or liquid fuel by one or more securing techniques. Ring-shaped isolators can be disposed around the circumference of the fuel tank or cylinder, as described in U.S. Pat. No. 6,202,674 and U.S. Pat. Pub. No. 20060061081, which are incorporated herein by reference in their entirety. The isolators may be formed from rubber or other elastomeric materials, which are described in greater detail elsewhere herein. Such isolators can, to some degree, protect the strap from wearing down by rubbing against the tank or cylinder surface. Such isolators may also function as dampers to vibrations that may occur on the vehicle and/or tank. However, when isolators are not secured to the tank or cylinder, or weakly secured to the tank or cylinder merely by the tension of the isolator material, such as rubber, glass fiber, carbon fiber, polymer or a composite material, the tank or cylinder may spin circumferentially or slip longitudinally within the strap. The spinning and slipping can damage the cylinder and potentially lead to build-up of gas pressure in an enclosed area, creating an explosion hazard. The spinning or slipping can cause the tank valve to loosen or cause damage to the fuel tubing, potentially causing a rapid depressurization or explosion hazard.

In some aspects of implementations, the isolator can be secured to the tank by means such as adhesion with a material such as glue, by friction created from the surface, ridges or ribs on the isolator, by strands, strings or ties that are a part of the isolator, by flaps that are a part of the isolator, by a combination of some or all of these techniques, or by some other means.

Figure 1:
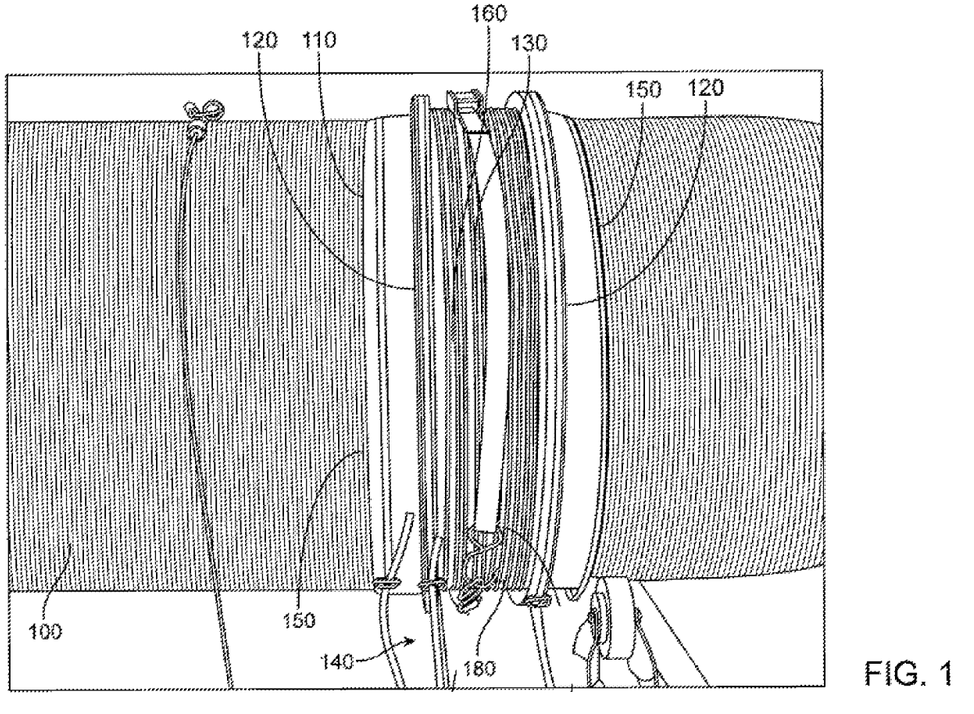
FIG. 1 illustrates a gas cylinder secured to a frame by a strap and an isolator that includes ribs, flaps, and ears, in accordance with an embodiment disclosed herein.

With reference to FIG. 1, which illustrates some aspects of the disclosure, a cylinder 100 may have an isolator 110 disposed around its circumference. The cylinder may be any fuel container, which may have various shapes, dimensions, proportions, or configurations. A cylindrical fuel tank is provided by way of illustration, but is not to be limiting.

Among other elements, the isolator 110 may include ears 120. Ears may extend out of the isolator surface. Ears may protrude radially out of the isolator. A strap 130 sits on isolator 110 and may be secured to the frame 140. In some instances, the strap may be positioned between a pair of ears. The ears may prevent the strap from sliding too much axially relative to the isolator. The isolator may further include flaps 150, which may create additional friction that can help prevent cylinder 100 from spinning and sliding. Flaps 150 may provide increased surface area for the contact of isolator 110 to the cylinder 100, thereby reducing the likelihood of the cylinder spinning or the isolator sliding off the cylinder. The isolator may also include ribs 160 that project out on the inner (in contact with the cylinder 100) and/or outer (in contact with the strap 130) surface of the isolator. The ribs may provide variation to the surface profile of the isolator, which may increase deformability and/or friction of the isolator surface. In this example, both flaps 150 and ribs 160 may provide isolator structure that helps advantageously fasten the isolator 110 to the cylinder 100, which may ultimately improve the way in which cylinder 100 is secured to frame 140 by strap 130.

Flaps 150 may extend longitudinally beyond the ears 120. Flaps may be provided on opposing sides of a pair of ears 120, sandwiching a central portion upon which a strap may lie. Flaps may be thinner than the ears 120. In some instances, flaps do not project as far out radially as ears.

Flaps 150 may be thicker or thinner than other parts of isolator 100. In some cases, flaps can range from about 1 mm to about 100 mm in thickness. In some instances, flaps 150 can be about 1 mm, or about 5 mm, or about 10 mm, or about 15 mm, or about 20 mm, or about 25 mm, or about 30 mm, or about 40 mm, or about 50 mm, or about 100 mm thick. Flaps may have a homogeneous or a non-homogeneous thickness profile. For instance, the flaps may have a thickness profile that forms a ramp from the ears to the tank surface. The flaps may slope downward from an ear portion of the isolator to the tank surface. In some cases, flaps 150 have a surface area in the range of about 5 $cm^2$ to about 500 $cm^2$, or about 5 $cm^2$, or about 10 $cm^2$, or about 20 $cm^2$, or about 30 $cm^2$, or about 40 $cm^2$, or about 50 $cm^2$, or about 60 $cm^2$, or about 70 $cm^2$, or about 80 $cm^2$, or about 90 $cm^2$, or about 100 $cm^2$, or about 500 $cm^2$.

Cylinder 100 may be formed of a metal such as steel, aluminum, glass fiber, carbon fiber, polymer, or a composite material such as carbon fiber reinforced polymer, another suitable material, or a combination thereof. The cylinder may contain a fuel therein, such as a gaseous fuel.

Figure 2:
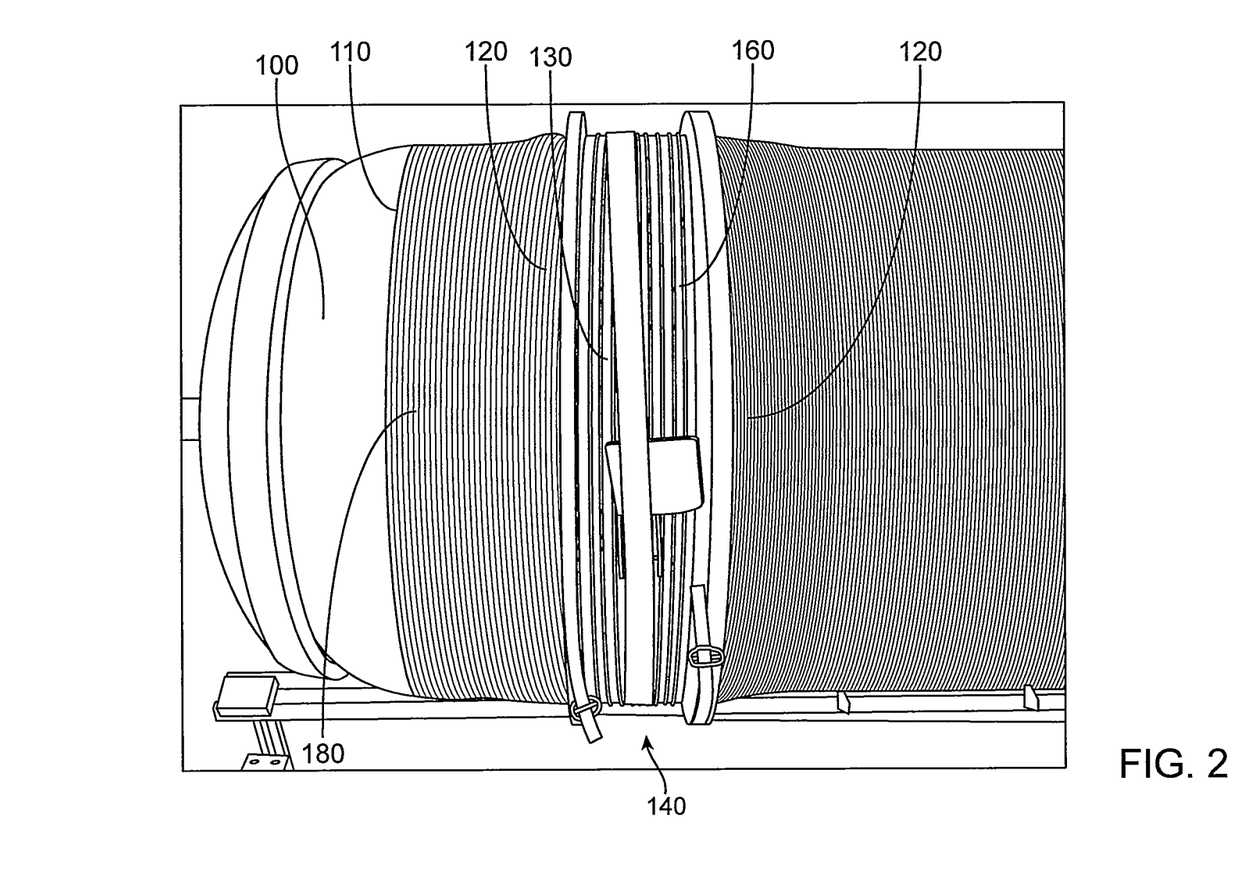
FIG. 2 illustrates a gas cylinder secured to a frame by a strap and an isolator that includes ribs, flaps, and strands wound into the gas cylinder, in accordance with an embodiment disclosed herein.
Figure 3:
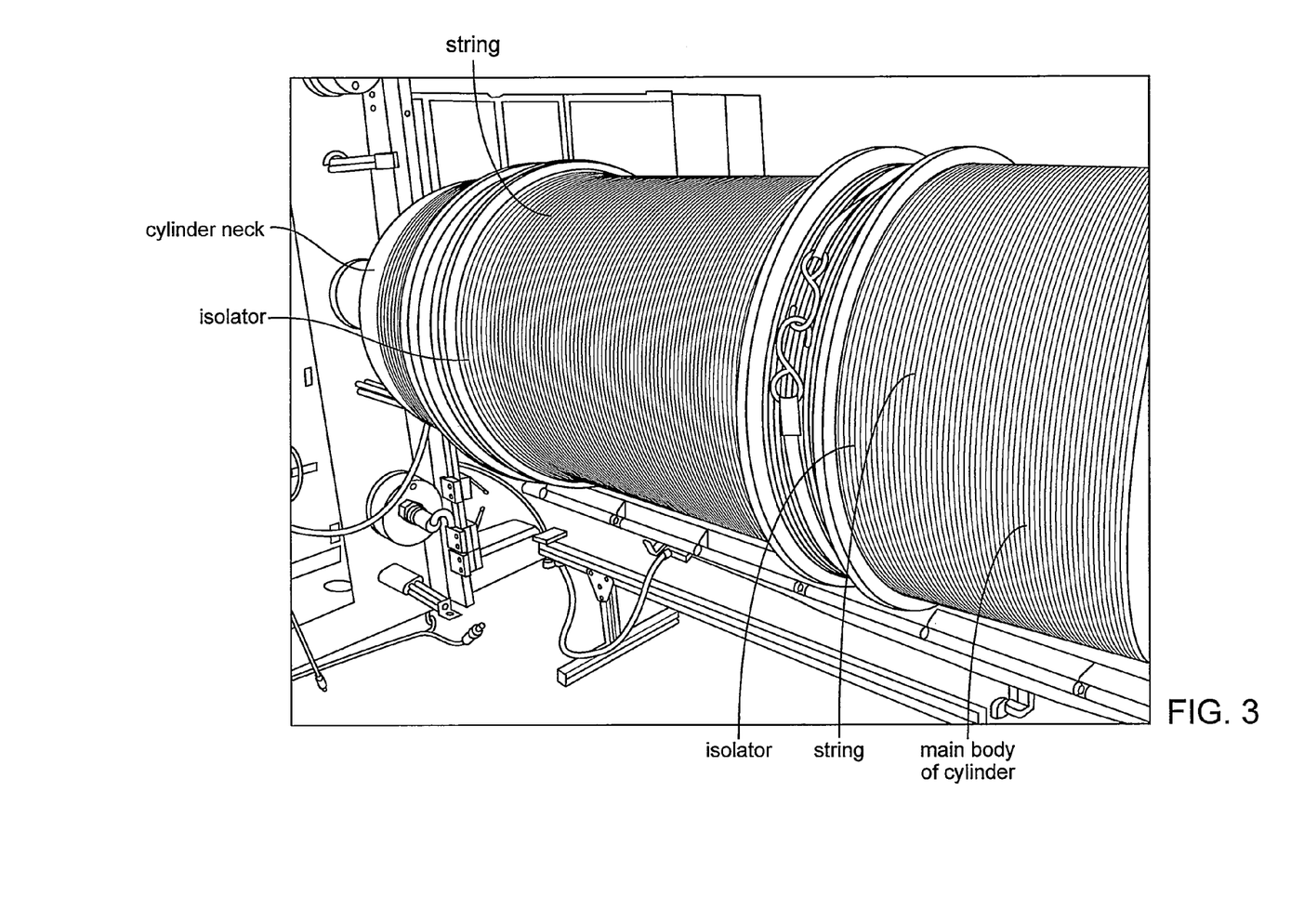
FIG. 3 provides another view of an isolator, cylinder, strap, and frame assembly in accordance with an embodiment disclosed herein.

FIG. 2 illustrates another example of an isolator, cylinder, strap, and frame assembly according to one implementation. Cylinder 100 may have isolator 110 disposed around its circumference. The cylinder may also have ears 120, strap 130, frame 140, and ribs 160. In addition, strands 180 may be attached to the isolator and wound around the cylinder 100. In some cases, strands 180 may be wound around the main body of the device configured to hold fuel, rather than the narrower neck of the device. As an example, FIG. 3 shows the location of cylinder neck relative to the cylinder main body. Strands 180 may provide additional means of securing the isolator to the cylinder, and because the strands can be attached to the isolator and can thus be thus a part of the isolator structure, spinning and sliding of the cylinder is minimized. Any description herein of said strands may apply to any strand-based covered as described further herein, and vice versa. Analogous to some aspects of the disclosure shown in FIG. 1, ribs 160 in FIG. 2 may provide a separate or combined mechanism for securing the isolator to the tank.

In some cases, FIG. 1 and FIG. 2 may depict sequential steps in the initial securing (FIG. 1) and further securing (FIG. 2) of isolator 110 to cylinder 100. In FIG. 1, isolator 110 is secured to cylinder 100 by flaps 150 and ribs 160. In FIG. 2, strands 180 is wound over the flaps (the flaps are obscured) to further secure isolator 110 to cylinder 100.

Figure 5:
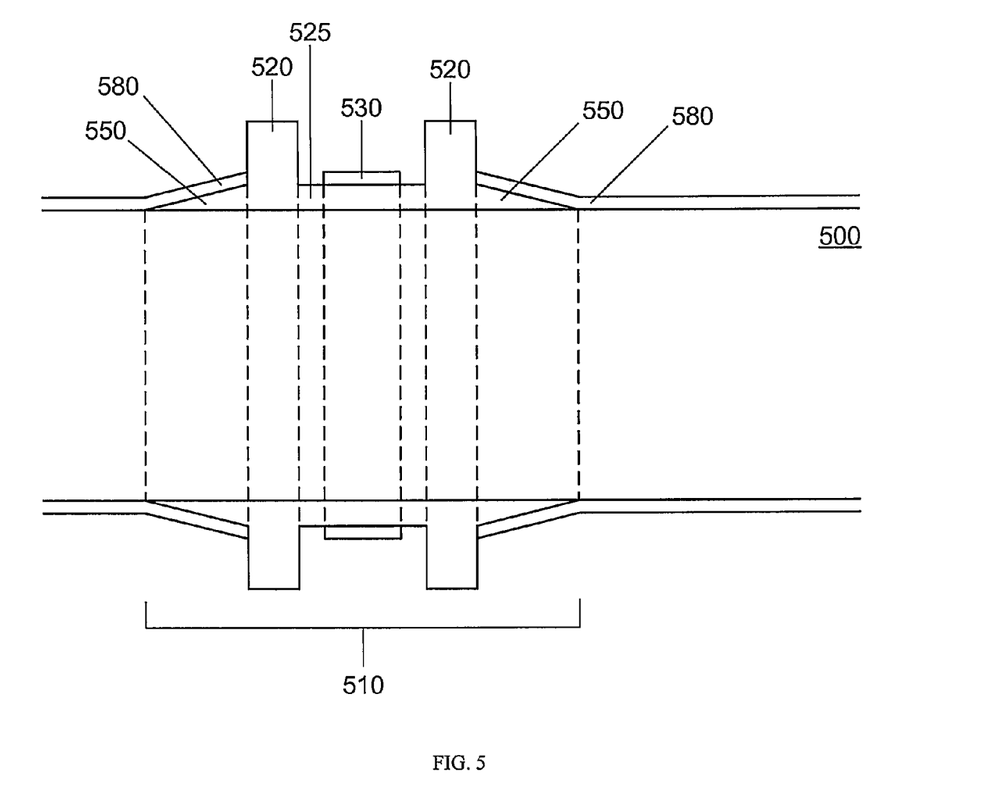
FIG. 5 provides an additional view of a tank securing mechanism, in accordance with an embodiment of the invention.

FIG. 5 provides an additional view of a tank securing mechanism. A quasi cut-away view may be provided to illustrate various components of the mechanism. A tank 500 may have an isolator 510 disposed thereon. The isolator may circumferentially encompass the tank. The isolator may be formed of an elastomeric material that is snugly placed around the tank's circumference. The isolator may have one or more parts, which may include a pair of ears 520, a central portion 525 between the pair of ears, and a pair of flaps 550 on the opposing sides of the ears relative to the central portion. The ears may protrude radially outward from the isolator. The central portion between the ears may have a lower profile than the ears. The central portion may optionally have ribs or ridges. A strap 530 may be positioned over the central portion and between the ears. The strap may have a circumference that is smaller than the outer circumference of the isolator defined by the ears, which may prevent it from slipping out over the ears. The flaps may extend laterally beyond the ears. In some instances, the flaps may have a sloping surface.

Strands 580 may be wound around a portion of the tank 500 and a portion of the isolator 510. The strands may be wound circumferentially around the tank and/or isolator. The windings of the strands may cover all or a portion of the tank surface and all or a portion of the flaps 550 of the isolator. The windings of the strands may cover a portion of the tank surface adjacent to the flaps and may continue on over the flaps up to the ears 520 of the isolator.

A winding region may encompass a continuously wound region on the tank and/or isolator. For example, a first winding region may be provided on a first side of an isolator, and a second winding region may be provided on a second side of the isolator. In some instances, a single strand may be wound per winding region. Alternatively, multiple strands may be wound into a winding region. The strands may be wound in a concentrated fashion (e.g., little or no exposed underlying surface in the winding region), or may be wound in a spaced fashion (e.g., more exposed underlying surface). In some instances, the strands may be so tightly wound in a concentrated fashion that there is no exposed underlying surface. There may be one, two, three or more layers of winding on the surface. In some instances, less than 50%, 40%, 30%, 25%, 20%, 15%, 10%, 5%, 3%, 1% or 0.1% of the underlying surface may be exposed in the winding region. Additional embodiments and/or characteristics of strands are described elsewhere herein.

Any description herein of strands may apply to any other type of strand-based covers, such as mats, fabrics, netting, or any other configuration, as described elsewhere herein.

Figure 6:
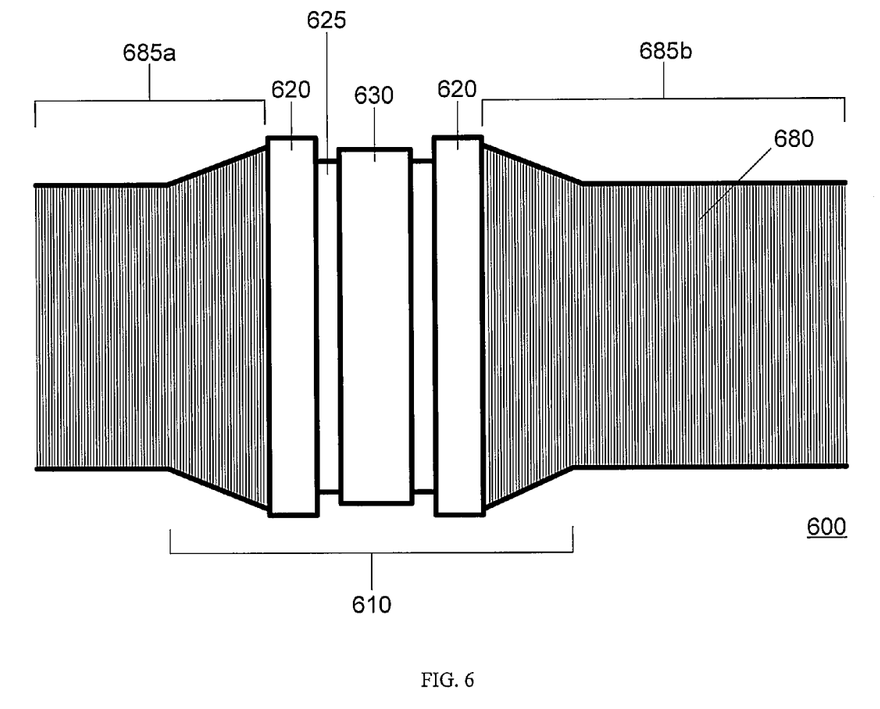
FIG. 6 provides an external view of a tank securing mechanism, in accordance with an embodiment of the invention.

FIG. 6 provides an external view of a tank securing mechanism. An isolator 610 may be provided around a circumference of a tank. The isolator may include ears 620, central region 625, or flaps. One or more strap 630 may be located around the isolator on the central region. The strap may be located between a pair of ears.

Strands 680 may be wound around a portion of the tank and isolator, thereby securing the isolator to the tank. The strands may be wound in a concentrated or looser fashion, as described herein. In some instances, winding regions 685a, 685b may be provided on both sides of the isolator, thereby securing both flaps of the isolator to the tank. The strands, as illustrated, may cover a portion of the tank and the flaps of the isolator. The sloping profile of the isolator flaps may or may not be discernible beneath the strand layers. Any description herein of the strands may apply to any other type of strand-based covers as described in greater detail elsewhere herein.

FIG. 3 provides another view of an isolator, cylinder, strap, and frame assembly in accordance with one or more implementations. FIG. 3 illustrates that a device configured to hold fuel may have more than one isolator disposed around its circumference. In some cases, as shown in FIG. 3, the isolator is disposed around the main body of the device, such as the main body of a cylinder, rather than around the neck of the device.

In some embodiments, one, two, three, four or more isolators may be provided on a tank. In some instances, each isolator may have strands wound over at least a portion of the isolator, as described in embodiments elsewhere herein. For instance, each isolator may have a pair of flaps that may be at least partially covered by strands. The isolators may be spaced in any fashion along the length of the tank. In some instances, the regions between the isolators are covered in strands as a single winding region. Alternatively, only portions of the regions between the isolators are covered as multiple winding regions.

A frame, such as frame 140, may be a part of a vehicle, and a vehicle may be any time of vehicle known in the art. A vehicle may be a truck, such as a light duty truck (e.g., class 1, class 2 or class 3), medium duty truck (e.g., class 4, class 5 or class 6), or heavy duty truck (e.g., class 7 or class 8). Vehicles include but are not limited to cars, wagons, vans, buses, high-occupancy vehicles, dump trucks, tractor trailer trucks, or any other vehicles. The vehicle may have any weight. For example, the vehicle may weigh more than or equal to about 5000 lbs, 7,500 lbs, 10,000 lbs, 12,500 lbs, 15,000 lbs, 17,500 lbs, 20,000 lbs, 22,500 lbs, 25,000 lbs, 30,000 lbs, or 35,000 lbs.

A device configured to hold fuel, such as cylinder 100, may be capable of containing a fuel with a certain amount of pressure. For example, the cylinder may be capable of containing a fuel having a range between about 100 psi and about 10000 psi, or having less than or equal to about 10000 psi, 8000 psi, 7000 psi, 6500 psi, 6000 psi, 5500 psi, 5000 psi, 4750 psi, 4500 psi, 4250 psi, 4000 psi, 3750 psi, 3500 psi, 3250 psi, 3000 psi, 2750 psi, 2500 psi, 2000 psi, 1500 psi, 1000 psi, 500 psi, 300 psi, 100 psi, or less. Alternatively, a fuel can be a liquid, such as liquefied natural gas.

A device configured to hold fuel, such as cylinder 100, may be capable of containing a gaseous fuel, such as natural gas, therein. Any reference to gaseous fuel or fuel may include natural gas. This may include liquefied natural gas (LNG) or compressed natural gas (CNG). A gaseous fuel may include hydrogen or hydrogen based gas, hythane, H2CNG, or any other gas.

A device configured to hold fuel, such as cylinder 100, may have one or more fuel output. The fuel output may transfer the fuel to another part of the vehicle, such as an engine. In one example, the fuel may be output to mix with air in the cylinder of an engine. The fuel may be used in the process of propelling the vehicle.

Figure 4:
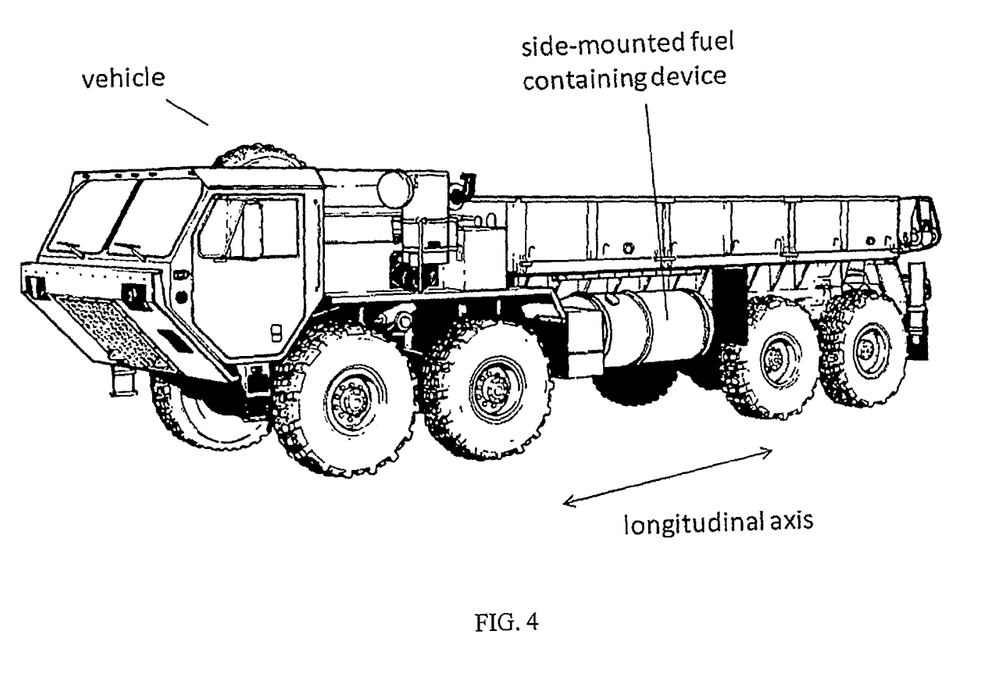
FIG. 4 illustrates a vehicle comprising a side-mounted device configured to hold fuel, the device having a longitudinal axis, in accordance with an embodiment disclosed herein.

A fuel holding device or vessel can be made from steel, aluminum, glass fiber, carbon fiber, polymer, carbon fiber reinforced polymer, or other suitable material or a combination of materials. A device configured to hold fuel can be mounted on a vehicle in any number of ways, such as side-mounted, rear-mounted, behind-the-cab mounted, or roof-mounted. One, two or more tanks may be mounted on a single side of the vehicle, or on each side of the vehicle. The side-mounted tanks may at least partially protrude from a side surface of the vehicle. FIG. 4 illustrates a side-mounted device configured to hold fuel attached to a vehicle, according to one or more implementations.

Straps, such as strap 130, can be made of various materials, including steel, carbon fiber, fiberglass (herein also "glass fiber"), a composite material such as a material containing a first component and a second component, such as a ceramic, metal, glass fiber, carbon fiber, and or/polymer or another suitable material or combination thereof.

Isolators, such as isolator 110, can be made from various materials, including rubber, plastic, thermoplastic materials, thermosetting materials, and self-healing polymers or composites, glass fiber, carbon fiber, plastic, a composite material such as carbon fiber reinforced polymer, or combinations thereof. The structures of the isolator, including features such as central region, flaps 150, ribs 160 and the pair of ears 120 can prepared by methods such as extrusion, injection molding, vulcanization, rotational molding, thermoforming, and thermoplastic compression molding, other known methods or combinations of known methods. These features may be integrally formed with the rest of the isolator into a unitary form, or may be attached to the isolator via adhesion, chemical bonding, or other techniques described herein. Specific materials that can used to make the isolators and their various features include one or more of rubber, polyethylene, polypropylene, other polyalkenes, polyglycols, poly-acids (such as polylactic acids), polythiols, disulfide-crosslinked polyalkenes, polyethylene terphthalate, polyvinyl chloride, polystyrene, or another suitable material.

In some cases, materials from which isolators are formed have compressive strength. In some cases, the compressive strength of the material is in a range of about 5 MPa to about 250 MPa, or at least about 5 MPa, or 15 MPa, or 15 MPa, or 25 MPa, or 35 MPa, or 45 MPa, or 55 MPa, or 65 MPa, or 75 MPa, or 85 MPa, or 100 MPa, or 150 MPa, or 250 MPa.

In some cases, materials from which isolators are formed have tensile strength. In some cases, the tensile strength of the material is in a range of about 5 MPa to about 250 MPa, or at least about 5 MPa, or 15 MPa, or 15 MPa, or 25 MPa, or 35 MPa, or 45 MPa, or 55 MPa, or 65 MPa, or 75 MPa, or 85 MPa, or 100 MPa, or 150 MPa, or 250 MPa.

In some cases, materials from which isolators are formed have a relatively high coefficient of friction with the surface of the device configured to hold fuel, which can be formed of aluminum, steel, glass fiber, carbon fiber, polymer, carbon fiber reinforced polymer, or other materials described above. In some cases, the coefficient of friction $\mu$ is in the range of about 0.05 to about 1.0, or at least about 0.05, or 0.1, or 0.15, or 0.2, or 0.25, or 0.3, or 0.35, or 0.4, or 0.55, or 0.5, or 0.55, or 0.6, or 0.65, or 0.7, or 0.75, or 0.8, or 0.85, or 0.9, or 0.95, or 1.0.

Strand-based covers, such as windings formed from strands (e.g., 180, 580, 680), may be formed from the same or different material as other parts of the isolator (i.e., the part of the isolator other than the strands, such as isolator 110 depicted in FIG. 2 minus strands). For example, the windings, such as strands, can be formed of a glass fiber, carbon fiber, polymer, a composite material such as carbon fiber reinforced polymer, or a combination thereof. In some cases, the windings are a part of an extruded isolator shape, and can be made by techniques described above, such as injection molding. In other cases, the strands are attached to the isolator body via an adhesive (see below), including by chemical bonding. The strands can be located on only one side of the isolator, or on both sides of the isolator, as depicted in FIG. 2. In some cases, the strands are secured to the surface of the device configured to hold fuel, such as cylinder 100, 500, by winding. In some cases, the strands are wound at least once, or at least twice, or at least three times, or at least four times, or at least 5 times, or at least 10 times, or at least 20 times, or at least 50 times, or at least 100 times, or at least 1000 times, or at least 5000 times, or at least 10000 times around the circumference of the device configured to hold fuel. In some cases, the winding holds the isolator against the surface of the device configured to hold fuel with the force of at least about 20 MPa.

In some cases, strands 180 (as in FIG. 2 or FIG. 5) may be wound over flaps 150 such that flaps 150 may be completely covered (uncovered flaps 150 are depicted in FIG. 1). In some cases, when space remains between adjacent windings of strands 180 and/or when the windings do not extend to the outer edges of flaps 150, flaps 150 may be partially covered. In some cases as when, for example, windings of strands 180 extend beyond the outer edges of flaps 150, or when flaps 150 are not present, strands 180 can come directly into contact with the surface of cylinder 100. In some cases, the surface of cylinder 100 can be partially covered by strands 180. In other cases, the surface of cylinder 100 can be fully covered by strands 180. In some cases, as when space remains between adjacent windings of strands 180 and/or when the windings do not extend to the outer edges of cylinder 100, the surface of cylinder 100 can be partially covered by strands 180.

In some cases, strands 180 may be wound around cylinder 100 and/or flaps 150 such that space remains between some or all adjacent pairs of individual windings. If space remains between individual windings, cylinder 100 and/or flaps 150 can be partially covered. In some cases, no space remains between any two adjacent pairs of individual windings of strands 180. In some cases, additional windings of strands 180 can be wound on top of the windings of strands 180 that are in contact with cylinder 100 and/or flaps 150. In such cases, the additional windings are not in contact with 100 and/or flaps 150. In some cases, there can be more than two layers of windings of strands 180.

In some cases, windings of strands 180 are layered evenly throughout the surface of the cylinder 100 such that thickness of the windings of strands 180 is substantially the same any parts of the surface of the cylinder 100 that are covered by the strands. In some cases, windings of strands 180 are layered unevenly such that the thickness of the windings of strands 180 covering the surface of the cylinder 100 varies. In some cases, the thickness of the windings of strands 180 gradually increases as the distance away from ears 120 increases. In other cases, the thickness of the windings of strands 180 gradually decreases as the distance away from ears 120 increases.

In some cases, the longitudinal distance between the windings of strands 180 is in the range of about 0 mm to about 10 mm, or at least about 0.0 mm, or about 0.1 mm, or about 0.5 mm, or about 1 mm, or about 1.5 mm, or about 2 mm, or about 2.5 mm, or about 3 mm, or about 3.5 mm, or about 4 mm, or about 4.5 mm, or about 5 mm, or about 5.5 mm, or about 6.0 mm, or about 6.5 mm, or about 7 mm, or about 7.5 mm, or about 8 mm, or about 8.5 mm, or about 9 mm, or about 9.5 mm, or about 10 mm.

The strands may be wound in the same direction, or may be wound in multiple directions. For example, the strands may all be wound in a clockwise direction when viewing a cross-section of the tank circumference, or all may be wound in a counter-clockwise direction. Alternatively, a mix may be provided of strands mixed in clockwise and counter-clockwise directions.

In some cases, the windings of strands 180 help prevent isolator 110 from moving longitudinally along the surface of cylinder 100. In some cases, the windings of strands 180 help prevent the cylinder 100 from spinning. In some cases, longitudinal movement or spinning of cylinder 100 is reduced by the assembly of isolator 110 and strap 130.

In some cases, the strands have a tubular shape. In some cases, the diameter of the strands is in the range of about 0.1 cm to about 1.0 cm is at least about 0.1 cm, or 0.15 cm, or 0.20 cm, or 0.25 cm, or 0.30 cm, or 0.45 cm, or 0.50 cm, or 0.55 cm, or 0.60 cm, or 0.65 cm, or 0.70 cm, or 0.75 cm, or 0.80 cm, or 0.85 cm, or 0.90 cm, or 0.95 cm, or 1.0 cm.

Any description herein of strands or windings may apply to any other type of strand-based covers. For example, strand-based covers may include strands on their own, as part of a fabric, cloth, mesh, net, or mat. In some instances, strand-based covers may incorporate materials that are made from a plurality of strands. The strand-based covers may include strands that have been woven or knotted together. The strands may have any characteristic, as described elsewhere herein. In some instances, the strand-based covers may include textiles where the strands forming the textiles may or may not have the characteristics of the wound strands described herein. Alternatively, any description of strand-based covers may include materials that are not formed from strands, such as homogeneous mats, covers, or tapes. A layer of the strand-based covers may or may not expose any underlying surface.

The strand-based covers may encircle the entirety or more of the circumference of the tank and/or portion of the isolator. The strand-based covers may encircle at least 99.9%, 99.5%, 99%, 97%, 95%, 90%, 80%, 70%, 60%, or 50% of the circumference of the tank and/or isolator. The strand-based covers may encircle at least a portion of the tank and flaps of the isolator. The strand-based cover may form a continuous piece that covers both the tank and flaps of the isolator. In some instances, a single layer of strand-based cover may be disposed over the underlying surface. Alternatively, multiple layers of strand-based cover may be provided over the underlying surface. Multiple portions of the strand-based cover or covers may overlap. The strand-based covers may be secured to the tank and/or portion of the isolator with aid of an adhesive.

In some cases, isolators, such as isolator 110, may be secured to device configured to hold fuel, such as cylinder 100, by an adhesive. The adhesive can be glue, solvent based adhesive, polymer dispersion adhesive, contact adhesive, hot-melt adhesive, reactive adhesive (such as polyester resin, polyurethane resin, or acrylic polymer), or another adhesive. In some cases, the adhesive creates a chemical bond between the surface of the isolator and the surface of the device configured to hold fuel.

In some instances, strand-based covers, such as wound strands may also be secured to the device and/or isolator with aid of an adhesive, such as those described herein.

Isolators Configured to Interact with Straps

Another aspect of the disclosure provides isolators with ribbed surfaces that can interact with the straps that hold the device configured to hold fuel in place in place. Ribs, herein also "ridges," improve the way in which the isolator protects the strap from the device configured to hold fuel, and vice versa. Ribs provide cushioning for the strap, and in doing so in effect increase the distance between the strap and the surface of the device configured to hold fuel. This reduces the friction between the strap and the fuel containing as transmitted by the isolator surface, as ribs of the isolator absorb some of the pressure applied by the cylinder to the strap and vice versa. Ribs can be a part of the isolator structure and project out on both the inner (in contact with the device configured to hold fuel) and outer (in contact with the strap or other securing structure) surface of the isolator. Rib structures can be fashioned by injection molding or other techniques described above.

The ribs or ridges can be hollow or filled with the material with which the isolator body is made, or with another material. The ribs can be spaced close or far apart. In some cases, the distance between the ribs can be in the range of about 0.1 cm to about 10 cm, or about 0.1 cm, or 0.2 cm, or 0.3 cm, or 0.4 cm, or 0.5 cm, or 0.6 cm, or 0.7 cm, or 0.8 cm, or 0.9 cm, or 1 cm, or 2 cm, or 3 cm, or 4 cm, or 5 cm, or 6 cm, or 7 cm, or 8 cm, or 9 cm, or 10 cm, or longer.

In some instances, the ribs or ridges can be substituted with other shapes that may have similar effects as the ribs or ridges, such as helping reduce the slippage of the strap 160. In some cases, grooves, bumps, indentation, or protrusions, or combinations thereof, may comprise the isolator body in addition or in the alternative to the ribs or ridges.

In some instances, ribs or ridges can be parallel to the strap, as for example in the case of ribs 130 or strap 160 in FIGS. 1 and 2. In other cases, the ribs or ridges can be perpendicular to the strap. In some instances, the ribs or ridges can be disposed at an oblique angle to the strap.

A device configured to hold fuel, such as cylinder 100 depicted in FIGS. 1 and 2, may be subject to pressure variations. When at least one component of the fuel is a gas, the pressure of the gas may vary in accordance with, for example, the ideal gas law. The ideal gas law can be expressed as $PV=nRT$, where P is pressure of gas, V is volume of gas, n is the number of moles of gas, T is temperature, and R is the ideal gas constant. Thus, when the temperature of the gas increases, e.g., because of an increase in the ambient temperature, the pressure of the gas may also increase, and the volume of the gas may alternatively or additionally increase as well. In some cases, the device configured to hold fuel will expand, or "breathe," with the changes in pressure and volume. Breathing may change the diameter of cylinder 100 by a difference in the range from about 0.01 cm to about 25 cm, or at least about 0.01 cm, or 0.05 cm, or 0.1 cm, 0.2 cm, or 0.3 cm, or 0.4 cm, or 0.5 cm, or 0.6 cm, or 0.7 cm, or 0.8 cm, or 0.9, or 1 cm, or 5 cm, or 10 cm, or 15 cm, or 20 cm, or 25 cm.

As the device configured to hold fuel, such as cylinder 100 depicted in FIGS. 1 and 2, expands, the pressure on the isolator 110 and strap 130, depicted in FIGS. 1 and 2, may in turn increase. In the absence of ribs 160, the pressure from the expanding fuel tank may cause strain in the strap 130, possibly causing it to rupture, at which point cylinder 100 would become unsecured. The cushioning provided by ribs 160, however, may effectively increase the distance between the cylinder 100 and strap 130, reducing the possibility of strap 130 breakage due to the expansion of cylinder 100 and concomitant friction between cylinder 100 and strap 130. In some cases, the effective distance between cylinder 100 and strap 130 due to cushioning by ribs 160 is in the range of about 0.1 cm to about 25 cm, or about 0.1 cm, or 0.5 cm, or 1 cm, or 2 cm, or 3 cm, or 4 cm, or 5 cm, or 6 cm, or 7 cm, or 8 cm, or 9 cm, or 10 cm, or 11 cm, or 12 cm, or 13 cm, or 14 cm, or 15 cm, or 16 cm, or 17 cm, or 18 cm, or 19 cm, or 20 cm, or 21 cm, or 22 cm, or 23 cm, or 24 cm, or 25 cm, or longer.

Ribs 160 may have material properties. For example, the ribs may have compressive strength (e.g., modulus) of at least about 5 MPa, or 15 MPa, or 15 MPa, or 25 MPa, or 35 MPa, or 45 MPa, or 55 MPa, or 65 MPa, or 75 MPa, or 85 MPa, or 100 MPa, or 150 MPa, or 250 MPa, or greater, or tensile strength of at least about 5 MPa, or 15 MPa, or 15 MPa, or 25 MPa, or 35 MPa, or 45 MPa, or 55 MPa, or 65 MPa, or 75 MPa, or 85 MPa, or 100 MPa, or 150 MPa, or 250 MPa, or greater. For example, ribs 160 may have the tensile strength of 15 MPa and a modulus of 10 MPa. These properties may enable ribs 160 to withstand pressure and friction from the cylinder 100 and strap 130.

Isolators Configured to Prevent Longitudinal Slipping

Another aspect of the invention provides isolators that include barriers preventing the straps from moving longitudinally, which may result in the strap sliding off the isolator and coming into direct contact with the device configured to hold fuel. Examples of barriers are a pair of ears 120 depicted in FIGS. 1 and 2. The barriers, such as ears 120, can have a greater height than ridges, such as ribs 160. In some cases, the barriers may have a height in the range of at least about 1 cm to about 90 cm, or of at least about 1 cm, or about 5 cm, or about 10 cm, or about 20 cm, or about 30 cm, or about 40 cm, or about 50 cm, or about 60 cm, or about 70 cm, or about 80 cm, or about 90 cm, or higher, from the surface of the device configured to hold fuel, such as cylinder 100. Strap 130 is disposed between the pair of barriers, such as the pair of ears 120, so that the strap is prevented from slipping or sliding off the isolator body in the longitudinal directions.

In some instances, the frame to which the strap secures the device configured to hold fuel can be a part of a vehicle. A vehicle may have a longitudinal axis. The longitudinal axis may or may not be parallel to a direction of motion for the vehicle. A device configured to hold fuel may have a longitudinal axis. In some embodiments, the longitudinal axis of the tank may be substantially parallel to a longitudinal axis of the vehicle. An example of the longitudinal axis of the tank is depicted in FIG. 4. In some cases, the movement of the strap along the longitudinal axis of the tank is restricted because of the barriers that are a part of the isolator.

In some cases, the ears can be fashioned by techniques described above, such as injection molding. In some cases, the ears can be made of the same material as other parts of the isolator. In other cases, the ears can be made of a different material than other parts of the isolator (i.e., the parts of the isolator other than the ears, such as isolator 110 depicted in FIG. 2 minus ears 120). In some cases, the ears 120 can be attached to the other parts of the isolator 110 by an adhesive. In other cases, the ears are a part of an extruded isolator shape. In some cases, the ears 120 may be integrally formed with the rest of the isolator 110 into a unitary form.

It should be understood from the foregoing that, while particular implementations have been illustrated and described, various modifications may be made thereto and are contemplated herein. It is also not intended that the invention be limited by the specific examples provided within the specification. While the invention has been described with reference to the aforementioned specification, the descriptions and illustrations of embodiments of the invention herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A fuel-holding device comprising:
   a tank body; and
   an isolator disposed circumferentially around the tank body of the fuel-holding device, wherein the isolator comprises (1) a central portion comprising ridges, (2) a pair of barriers on opposing sides of the central portion and adjacent to the central portion, and (3) a pair of flaps on the opposing sides of the central portion such that the pair of barriers and the central portion are bounded between the pair of flaps; and
   strand-based covers that wrap around the tank body and at least a portion of the pair of flaps without covering the pair of barriers and the central portion.

2. The device of claim 1, wherein a height of the pair of barriers is greater than a height of the ridges of the central portion.

3. The device of claim 1, wherein each flap of the pair of flaps has a sloping thickness profile, such that each flap slopes downward from an edge of the adjacent barrier to a corresponding external side surface of the tank body.

4. The device of claim 1, wherein the strand-based covers comprise one or more layers of windings of strands.

5. The device of claim 4, wherein the one or more layers of windings of strands are wrapped around the tank body evenly such that a thickness of the one or more layers of windings of strands is substantially uniform across the tank body.

6. The device of claim 1, wherein the isolator is configured to receive a strap to be wrapped around the ridges of the central portion.

7. The device of claim 4, wherein the one or more layers of windings of strands are wrapped around the tank body in an uneven manner such that a thickness of the one or more layers of windings of strands is varied across the tank body.

8. The device of claim 4, wherein the thickness of the one or more layers of windings of strands increases with increasing distance from the central portion and the barriers.

9. A system for securing a fuel-holding device to a frame, comprising:
   an isolator fastened to the fuel-holding device, wherein the isolator comprises (1) a central portion comprising ridges, (2) a pair of barriers on opposing sides of the central portion and adjacent to the central portion, and (3) a pair of flaps on the opposing sides of the central portion such that the pair of barriers and the central portion are bounded between the pair of flaps;
   a strap disposed around the circumference of isolator, wherein the strap is attached to the frame, and wherein the strap and the isolator secure the fuel-holding device to the frame; and
   strand-based covers that wrap around the tank body and at least a portion of the pair of flaps without covering the pair of barriers and the central portion.

10. The device of claim 6, wherein the ridges are configured to increase a distance between the strap and an external surface of the tank body, so as to reduce strain in the strap caused by expansion of the tank body.

11. The device of claim 10, wherein the increased distance reduces (1) strain in the strap caused by expansion of the tank body due to temperature and pressure changes of fuel stored within the tank body, and (2) friction between the strap and the external surface of the tank body caused by movement of the strap on the external surface of the tank body.

12. The device of claim 6, wherein the ridges are substantially parallel to the strap when the strap is wrapped around the ridges of the central portion.

13. The device of claim 6, wherein the ridges are substantially perpendicular to the strap when the strap is wrapped around the ridges of the central portion.

14. The device of claim 6, wherein the ridges are at an oblique angle to the strap when the strap is wrapped around the ridges of the central portion.

15. The device of claim 7, wherein the thickness of the one or more layers of windings of strands decreases with increasing distance from the central portion and the barriers.

16. The device of claim 4, wherein the one or more layers of windings of strands are wrapped around the tank body in a same direction.

17. A method of mounting a fuel-holding device comprising:
    providing at least one isolator around a tank body of the fuel-holding device, wherein the isolator comprises (1) a central portion comprising ridges, (2) a pair of barriers on opposing sides of the central portion and adjacent to the central portion, and (3) a pair of flaps on the opposing sides of the central portion such that the pair of barriers and the central portion are bounded between the pair of flaps; and
    covering the tank body and at least a portion of the pair of flaps with strand-based covers, thereby securing the isolator to the tank body to mount the fuel-holding device, wherein the pair of barriers and the central portion of the isolator are not covered by the strand-based covers.

18. The device of claim 4, wherein one or more layers of windings of strands are wrapped around the tank body in different directions.

19. The device of claim 18, wherein a first layer of windings of strands is wrapped around the tank body in a clockwise direction, and a second layer of windings of strands is wrapped around the tank body in a counter-clockwise direction.

20. The device of claim 4, wherein the one or more layers of windings of strands prevent the isolator from moving longitudinally along or spinning relative to an external surface of the tank body.

* * * * *